(12) United States Patent
Cohen

(10) Patent No.: US 10,092,105 B2
(45) Date of Patent: Oct. 9, 2018

(54) COLLAPSIBLE MULTI-POSITION MODULAR EASEL STAND

(71) Applicant: Mark Cohen, Oceanside, NY (US)

(72) Inventor: Mark Cohen, Oceanside, NY (US)

(73) Assignee: Mac Specialties, LTD., Oceanside, NY (US)

( * ) Notice: Subject to any disclaimer, the term of this patent is extended or adjusted under 35 U.S.C. 154(b) by 0 days.

(21) Appl. No.: 15/627,617

(22) Filed: Jun. 20, 2017

(65) Prior Publication Data

US 2017/0360200 A1    Dec. 21, 2017

Related U.S. Application Data

(60) Provisional application No. 62/352,268, filed on Jun. 20, 2016.

(51) Int. Cl.
| | |
|---|---|
| *A47B 97/04* | (2006.01) |
| *A47G 1/24* | (2006.01) |
| *F16M 11/00* | (2006.01) |
| *A47B 97/08* | (2006.01) |
| *F16M 11/10* | (2006.01) |
| *F16M 13/00* | (2006.01) |
| *A47B 23/04* | (2006.01) |

(52) U.S. Cl.
CPC .............. *A47B 97/08* (2013.01); *F16M 11/10* (2013.01); *F16M 13/00* (2013.01); *A47B 23/04* (2013.01)

(58) Field of Classification Search
CPC ...... F16M 11/10; F16M 11/105; F16M 13/00; A47B 97/08; A47B 23/042; A47B 23/043; A47B 23/044

USPC ... 248/176.1, 176.3, 176.4, 451, 455, 441.1, 248/447, 454, 456, 457, 460
See application file for complete search history.

(56) References Cited

U.S. PATENT DOCUMENTS

| | | |
|---|---|---|
| 1,470,159 A | 10/1923 | Gibson |
| 1,976,421 A | 10/1934 | Traeger et al. |
| 2,591,170 A | 4/1952 | Levinson et al. |
| 3,785,605 A * | 1/1974 | Parekh ................. A47B 23/044 248/455 |
| 4,105,182 A | 8/1978 | Jacobson |

(Continued)

*Primary Examiner* — Tan Le
(74) *Attorney, Agent, or Firm* — Danielle C. Sullivan; Carter Ledyard & Milburn LLP

(57) ABSTRACT

A collapsible, two part easel for holding objects such as smartphones, cell phones, iPads, business cards, recipes, and calendars. The profile of the easel in the assembled position creates an angled support surface. The base of a viewable object rests on the top inside portion of the shelf created by the protruding support surface, and the back of the display object rests against the back angled inside portion of the perpendicular surfaces. The angle of the backrest creates a fixed viewing angle of the display object. The easel is easily assembled from its ship-flat position by rotating the perpendicular locking object support panel 90 degrees on its integral locking pivot cylinder already inserted into the variable sized backrest. The easels can be modularly locked together, or incorporate multiple easel supports on the back panel to support larger objects and increase the amount of graphics. The assembled unit, when the two parts are locked together becomes a structural support member. A secondary set of structural elements snap into the rear of the assembled easel to further enhance its strength.

13 Claims, 9 Drawing Sheets

(56) References Cited

U.S. PATENT DOCUMENTS

| | | | |
|---|---|---|---|
| 5,388,798 A | 2/1995 | Glick | |
| 5,516,072 A * | 5/1996 | Shinno | A47B 23/044 248/174 |
| 5,522,574 A * | 6/1996 | Maglione | A47F 5/0815 248/174 |
| 5,620,104 A * | 4/1997 | Maglione | A47F 5/0815 211/189 |
| 5,755,423 A | 5/1998 | Michela | |
| 6,270,049 B1 | 8/2001 | Olvey | |
| 6,386,500 B1 * | 5/2002 | Dainoff | A47B 23/042 248/451 |
| D468,542 S * | 1/2003 | Hennekes | D6/310 |
| 6,648,293 B1 | 11/2003 | Sachnoff | |
| 7,000,882 B2 | 2/2006 | Snuffer et al. | |
| 7,178,778 B2 | 2/2007 | Lee | |
| 7,219,871 B2 | 5/2007 | Hecker | |
| 7,270,435 B2 | 9/2007 | Lin | |
| 7,334,768 B1 | 2/2008 | Lum | |
| 8,056,871 B2 * | 11/2011 | Matias | A47B 23/043 248/176.1 |
| 9,194,536 B2 * | 11/2015 | Kim | F16M 13/00 |
| 9,714,816 B2 * | 7/2017 | Temple | F41J 1/10 |
| 2010/0213331 A1 * | 8/2010 | Liou | F16M 11/105 248/176.3 |

* cited by examiner

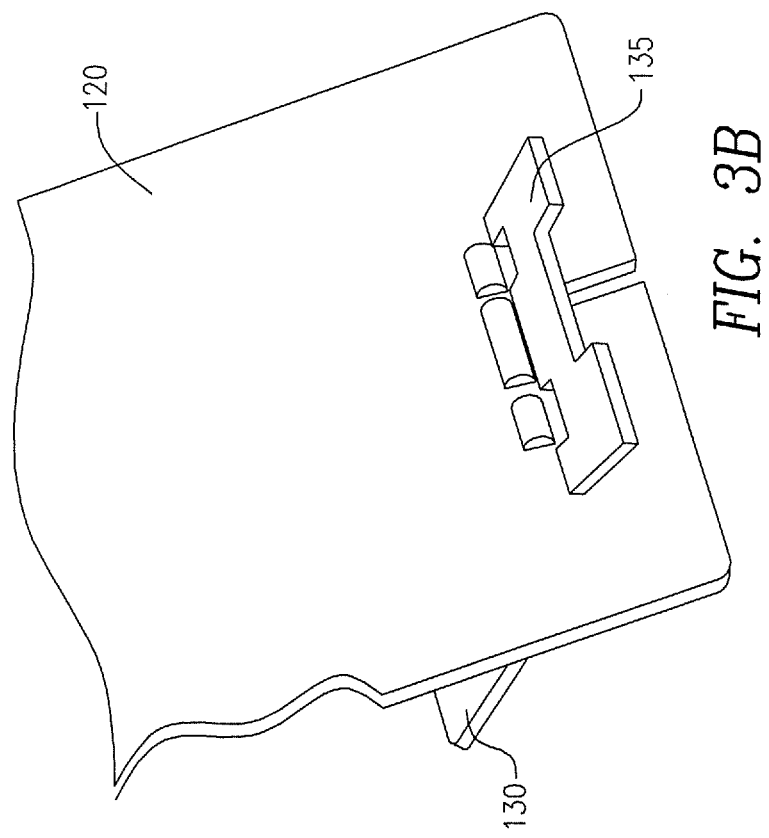
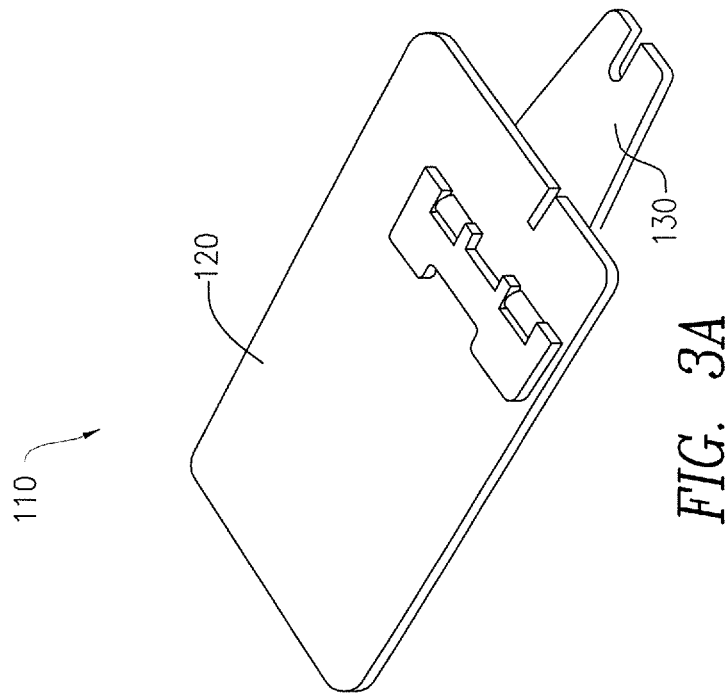
FIG. 3B
FIG. 3A

COLLAPSIBLE MULTI-POSITION MODULAR EASEL STAND

This application claims priority to U.S. Provisional Patent Application No. 62/352,268 filed Jun. 20, 2016, entitled "COLLAPSIBLE MULTI-POSITION MODULAR EASEL STAND" and is hereby incorporated by reference in its entirety.

This invention relates to easels for holding and displaying objects including smartphones, cell phones, tablets, cameras, business cards, recipe cards, books and calendars.

BACKGROUND OF THE INVENTION

There have been numerous designs for display easels proposed. Some of these designs incorporate an opening in the front of the easel in which the object being displayed is placed. U.S. Pat. No. 7,270,435 to Lin and U.S. Pat. No. 6,648,293 to Sachnoff have such an opening. This type of design doesn't permit objects of varying widths to be placed on the easel and the angle at which the object rests on the easel is not adjustable. Of the easel designs that incorporate a shelf for an object to rest on, allowing objects of varying widths to be placed on it, many allow the easel to be collapsed for portability reasons. U.S. Pat. No. 7,334,768 to Lum collapses but does not collapse completely flat. The design also uses a number of parts including hinges to connect the parts of the easel together. Another easel design, U.S. Pat. No. 2,591,170 to Levinson, also has multiple parts including pin hinges that hold the structural parts together. Because both of these designs have multiple parts, the complexity and cost of manufacturing is increased.

Of those easel designs that are made from one piece of material, few are both collapsible and adjustable. The design claimed incorporates the ability to manufacture the rear support panel with variable multiple slot positions in the rear support panel to provide different view angles. One common design type is based on a V-shaped structure. U.S. Pat. No. 7,000,882 to Snuffer and U.S. Pat. No. 5,388,798 to Glick are examples of the V-shaped design. Although these easels are adjustable, the angle of adjustability is narrow. Also, when these easels are collapsed, their profiles are jagged making them less portable. Another type of easel design uses a triangular shape structure. U.S. Pat. No. 7,178,778 to Lee and U.S. Pat. No. 6,270,049 to Olvey are both examples of this type of design. They are adjustable by partially folding the base of the easel. But there are only two adjustment settings. U.S. Pat. No. 4,105,182 to Jacobson, another triangular design, comprises a single strip of material in the form of a triangle. It utilizes a pair of slits on one end of a strip through which the other end of the strip goes in one slit and out the other to form an upside down V-shaped shelf. Although collapsible, the easel must be disassembled beforehand. Another one-piece design, U.S. Pat. No. 1,976,421 to Traeger, is not adjustable and needs to be disassembled before folding up. U.S. Pat. No. 7,219,871 to Hecker and U.S. Pat. No. 5,755,423 to Michela are examples of an origami-like non-adjustable easel design. Michela's easel includes parts that need to be glued together, complicating the manufacturing process. U.S. Pat. No. 1,470,159 to Gibson, proposed an M-shaped easel design but it lacks stability.

Smart phones have become ubiquitous in the personal and business communication world. They feature a screen on which may be displayed various forms of information including videos, movies and e-books. To view the screen ergonomically, the smart phone must be either held or propped up by some means so that a proper viewing angle may be achieved. In many instances, it is so desired to be able to charge said electronic device while being held in a position to view the object.

SUMMARY OF THE INVENTION

The present invention provides an easel for holding objects.

The present invention provides an easel for holding objects including a first flat panel with multiple holes and slots, and a second panel having an insertable snap-lock pivoting barrel-hinge device, wherein the second panel creates a shelf for said objects to be placed upon.

The present intention also provides a method of assembling an easel from a planar strip of material, the steps including inserting a narrow section through a variable positioned midsection slot in a wide section to adjust the view angle.

Some of the advantages of the present invention over the prior art include: a compact design and thin configuration for purposes of portability, storage, and packaging; reduced manufacturing cost as the easel is comprised of inexpensive material and minimal parts; stability for objects to rest; and the easels may be modularly connectable to create a wider graphic element, or support a wider object.

BRIEF DESCRIPTION OF THE DRAWINGS

Embodiments are illustrated by way of example, and not by way of limitation, in the figures of the accompanying drawings in which like reference numerals refer to similar elements and in which:

FIG. 3A shows a perspective view of the un-assembled easel;

FIG. 3B shows a pre-assembled view of the easel in the mid-fold position and not yet locked in place;

DETAILED DESCRIPTION

The present invention provides a collapsible, two part easel for holding objects such as smartphones, cell phones, iPads, business cards, recipes, and calendars. The profile of the easel in the assembled position creates an angled support surface. The base of a viewable object rests on the top inside portion of the shelf created by the protruding support surface, and the back of the display object rests against the back angled inside portion of the perpendicular surfaces. The angle of the backrest creates a fixed viewing angle of the display object. The easel is easily assembled from its ship-flat position by rotating the perpendicular locking object support panel 90 degrees on its integral locking pivot cylinder already inserted into the variable sized backrest. The easels can be modularly locked together, or incorporate multiple easel supports on the back panel to support larger objects and increase the amount of graphics. No hinges are used to lock the support panel into a locked position, but rather a snap lock mechanism. The assembled unit, when the two parts are locked together becomes a structural support member. A secondary set of structural elements can snap into the rear of the assembled easel to further enhance its strength.

Figure 1:
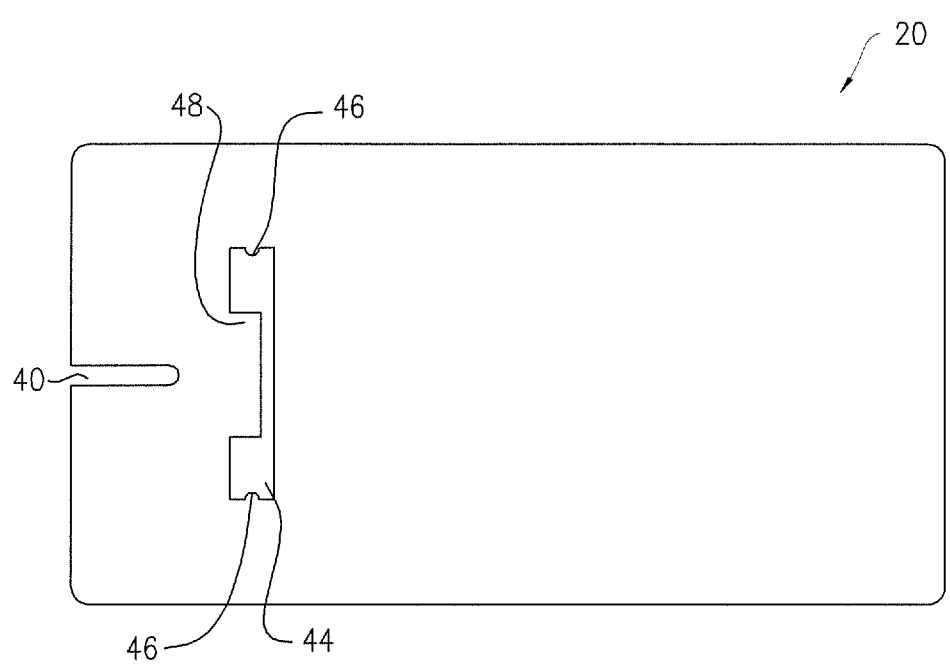
FIG. 1 shows a back panel portion of the easel assembly.

FIG. 1 shows the back panel section 20 of the claimed easel. Back panel 20 includes a vertical slot 40 at the base of the panel as well as an insert slot 44 located within the back panel. The location of insert slot 44 can vary based on the desired resting angle of the object as well as the number of insert slots positioned within back panel 20. The shape of insert slot includes nodes 46 and indent 48 which are used in the snap lock mechanism of the present invention to secure support panel 30 in its angled position.

Figure 2A:
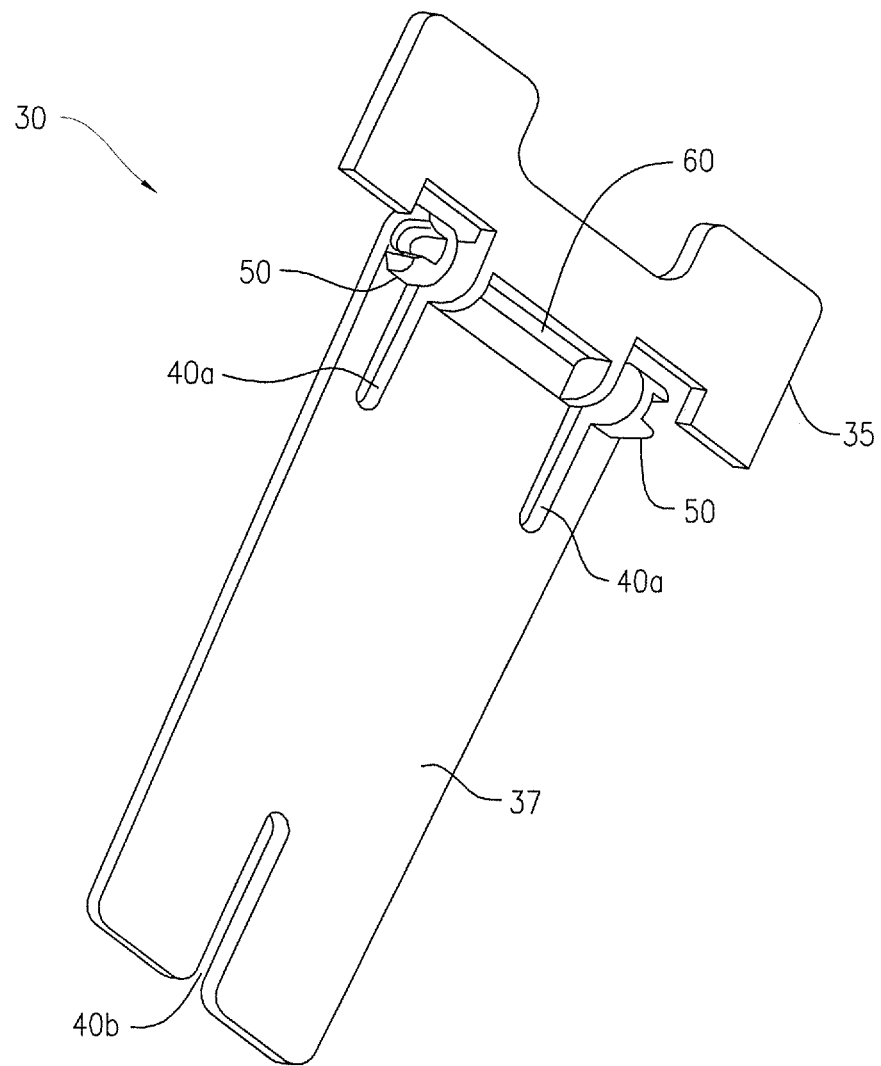
FIG. 2A shows the bottom side of a support panel of the easel assembly.
Figure 2B:
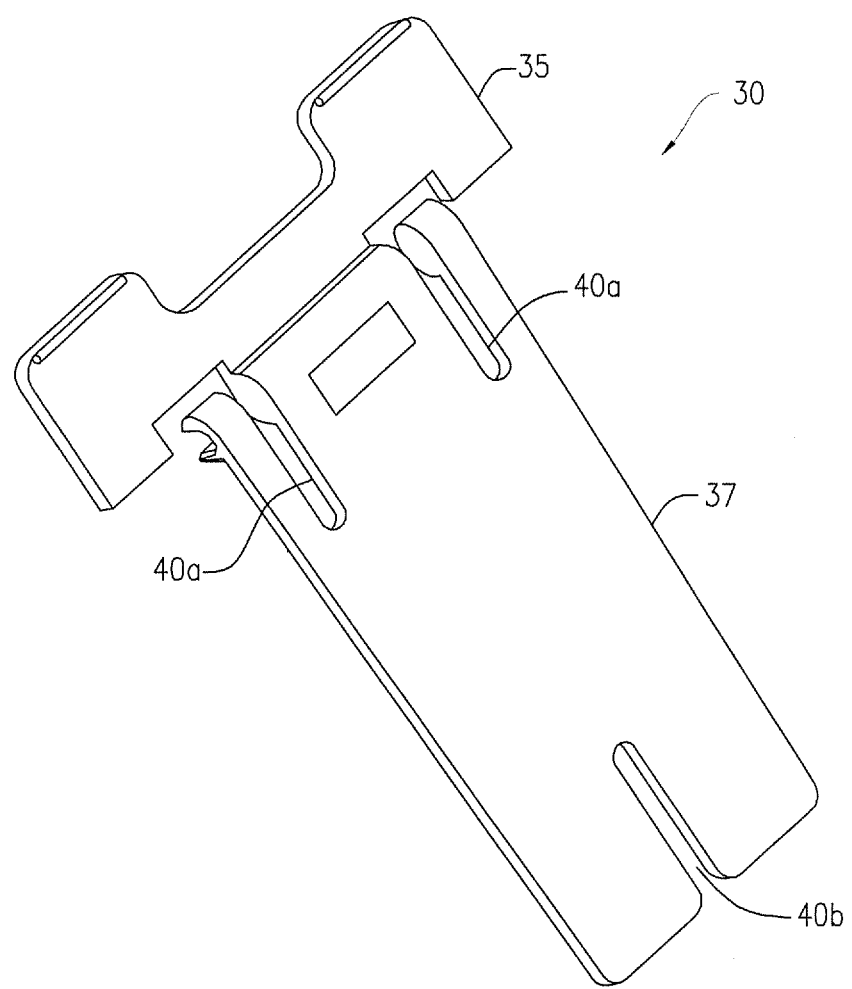
FIG. 2B shows the top side of a support panel of the easel assembly.

FIGS. 2A and 2B show the bottom side and topside, respectively, of support panel 30. Support panel 30 comprises two sections, top shelf portion 35 and base support 37. Top shelf 35 is on the front side of back panel 20 and the support 37 is on the opposite side. Support panel 30 includes vertical slots 40a and 40b. Vertical slots 40a can be used when additional supports are added to the easel. Vertical slot 40b can be used to hold electrical wires of the object being held. Support panel 30 is a unique one piece assembly that snaps in and locks in position to back panel 20 without the use of hinges or an axle. Support panel 30 glides into slot 44 and over nodes 46. Indent 48 of the back panel locks into u shape 60 of support panel 30. Pivot joints/stops 50 engage with nodes 46.

FIG. 3a shows an easel 110 for holding objects in a flat form, which can be used for mailings for example. The easel can be constructed from two panels of planar material, a back panel 120 and a support panel 130. Back panel 120 can be flat die cut for example. The two pieces lie flat. FIG. 3b shows a pre-assembled easel 110 in a mid-pivot position. Support panel 130 is not in a locked position.

Figure 4:
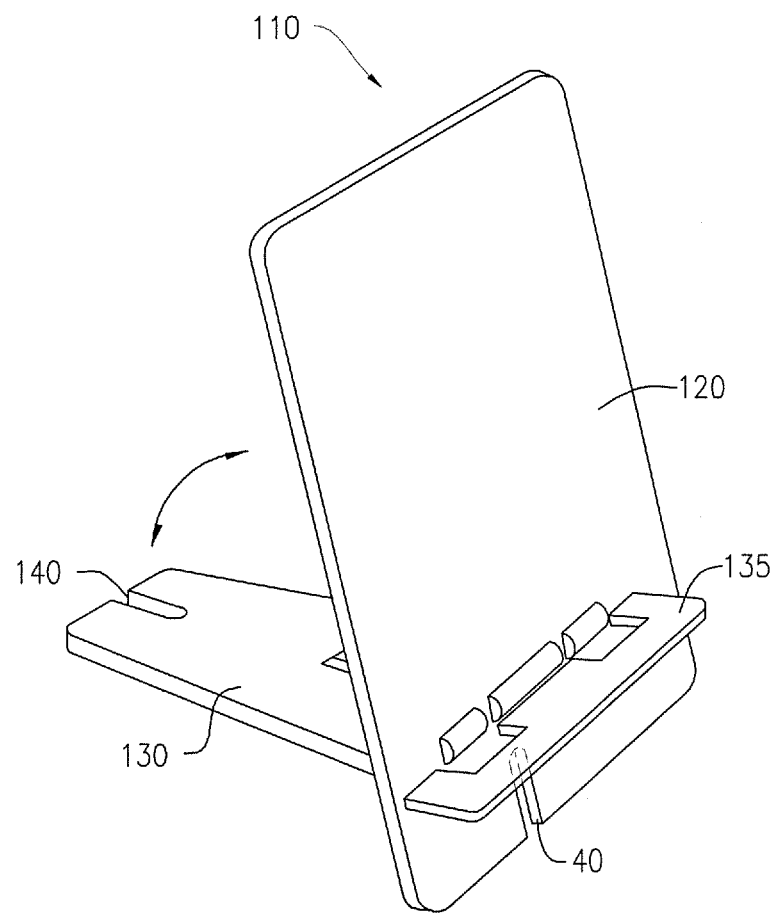
FIG. 4 shows an assembled view of the support member of the easel as a molded snap-lock panel, rotated 90 degrees into the locked position.

FIG. 4 shows assembled easel 110. Support panel 130 goes through back panel 120 and provides a shelf top 135 and back panel 120 provides a backrest of the easel 110. Once support panel 130 is rotated 90 degrees into the locked position, the barrel pivot-hinge locks the two elements firmly together, requiting substantial force to return to a folded position. The two part easel 110 creates a variable angled viewing attitude based on the positioning of the pre-inserted object support panel 130 into the back panel 120, allowing objects, such as smart phones for example, to sit stably on easel 110, The easel's backrest angle may be easily manufactured with multiple slots for an optimal viewing angle of display objects resting on the easel. The angle at which the object rests on easel 110 is adjustable based on the manufactured slots in back panel 120. Back panel 120 can have one slot for the insertion of support panel 130 or can be manufactured with multiple slots for the insertion of support panel 130, The location of the slot adjust the angel at which the support panel rests. Easel 110 collapses flat, removably holding together the two parts for portability, storage and packaging purposes. The two-part easel assembly incorporates a one-way locking feature, which when snapped into position prevents easel 110 from collapsing. Vertical slots 140a and 140b are provided in both back panel 120 and support panel 130. The series of vertical slots 140b in the back panels (and support panel 130) provide clearance for a charging element wire to protrude through the support surface so that electronic devices that have the charging port located on their base may be charged while resting on the easel. Top shelf 135 the easel holds the display object raised off the surface on which the easel 110 rests, providing protection against liquid spills that could damage the display object.

Figure 5:
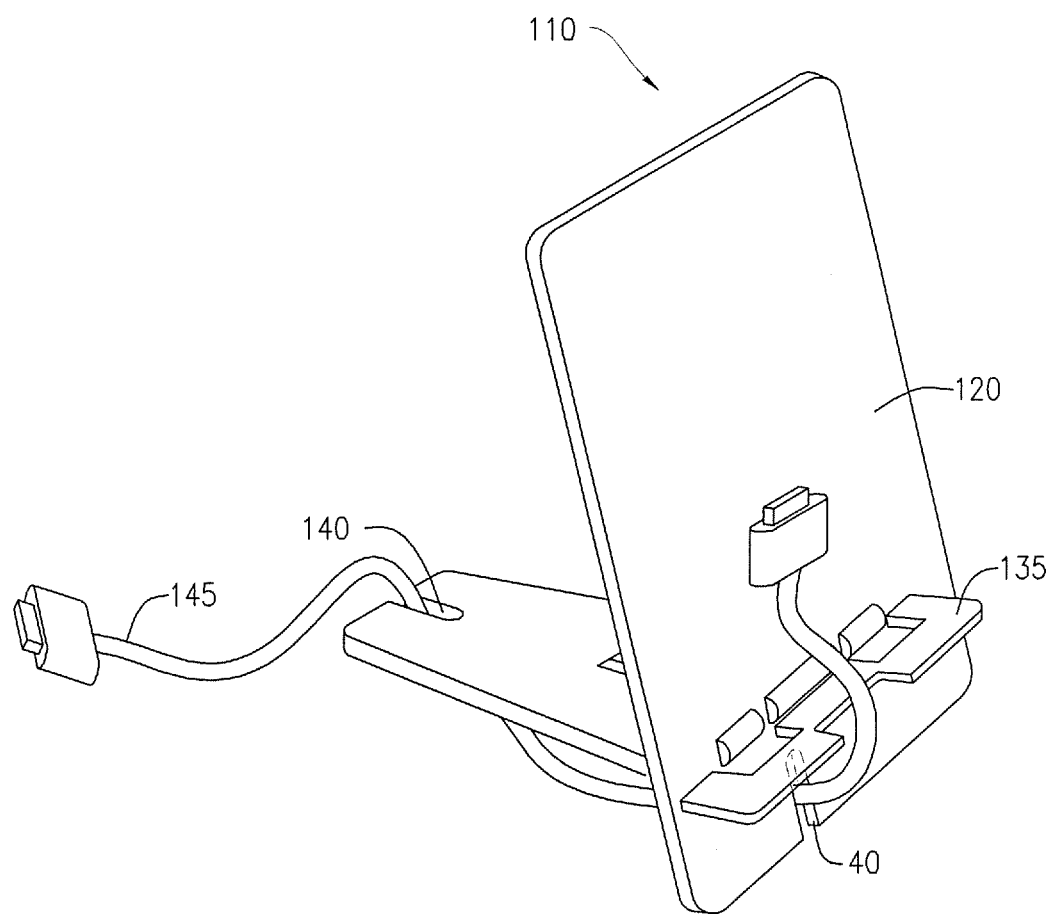
FIG. 5 shows openings in the front of the easel through which a charging plug of an electronic device is inserted.

FIG. 5 shows vertical slots 140 which are openings in the front of the easel 110 as well as in the support panel 130. A charging plug 145 of an electronic device may be inserted in slots 140 in order to charge the device while resting on shelf 135.

Figure 6:
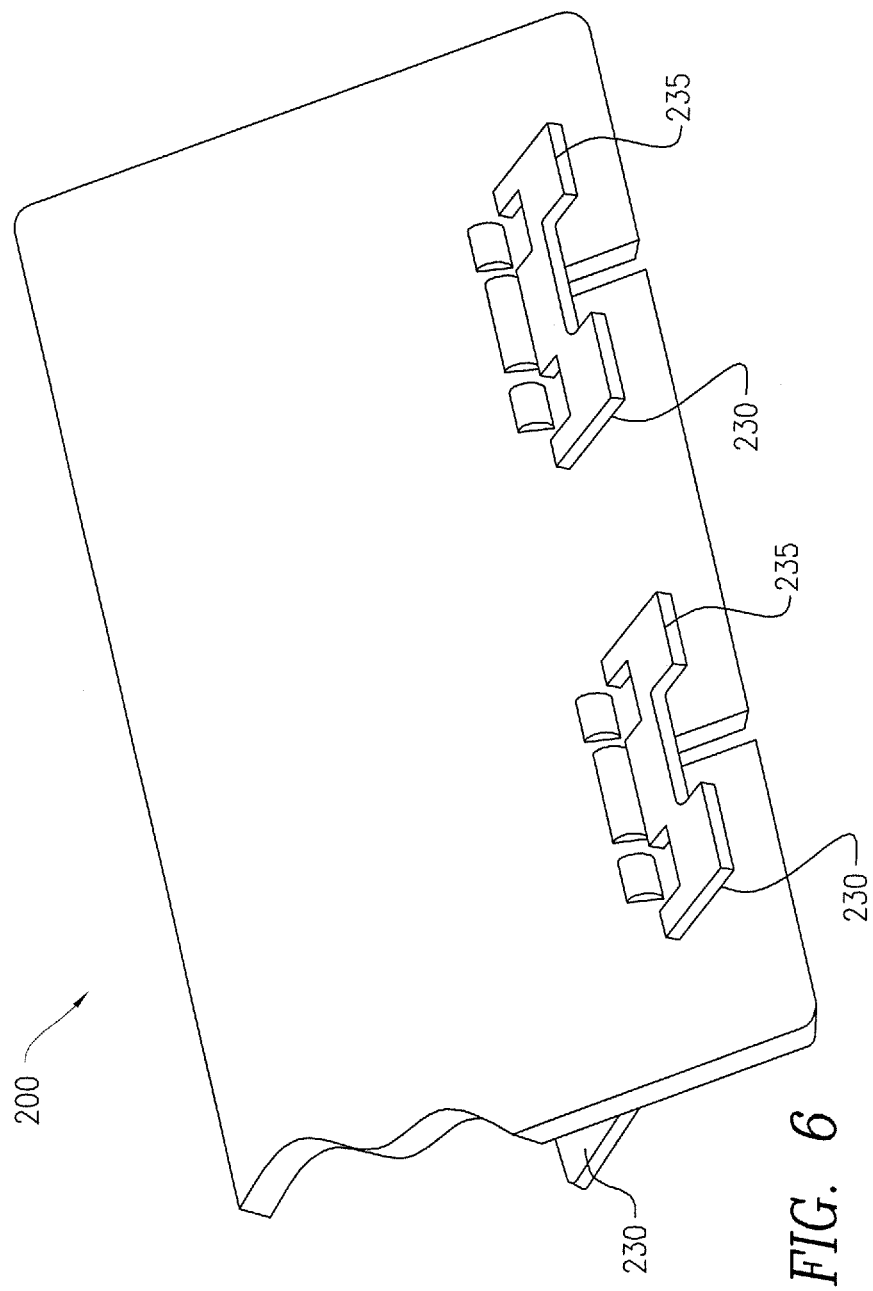
FIG. 6 shows multiple units support easel platforms attached to support a wider object.

FIG. 6 shows an easel platform for wider objects. Easel 200 consists of two support panels 230 attached to back panel 220. The size of the back panel 220 and the number of support panels 230 may vary depending on the desired size of the object to be held, Multiple support panels 230 can be locked laterally side by side to create a wider graphic image on the back panel 220, or support a wider object. Multiple independent single easel support panels 230 can be added to provide stability for a much wider back panel 220, on top shelves 235 or to support two Smartphones or other objects requiring an angled attitude.

Figure 7:
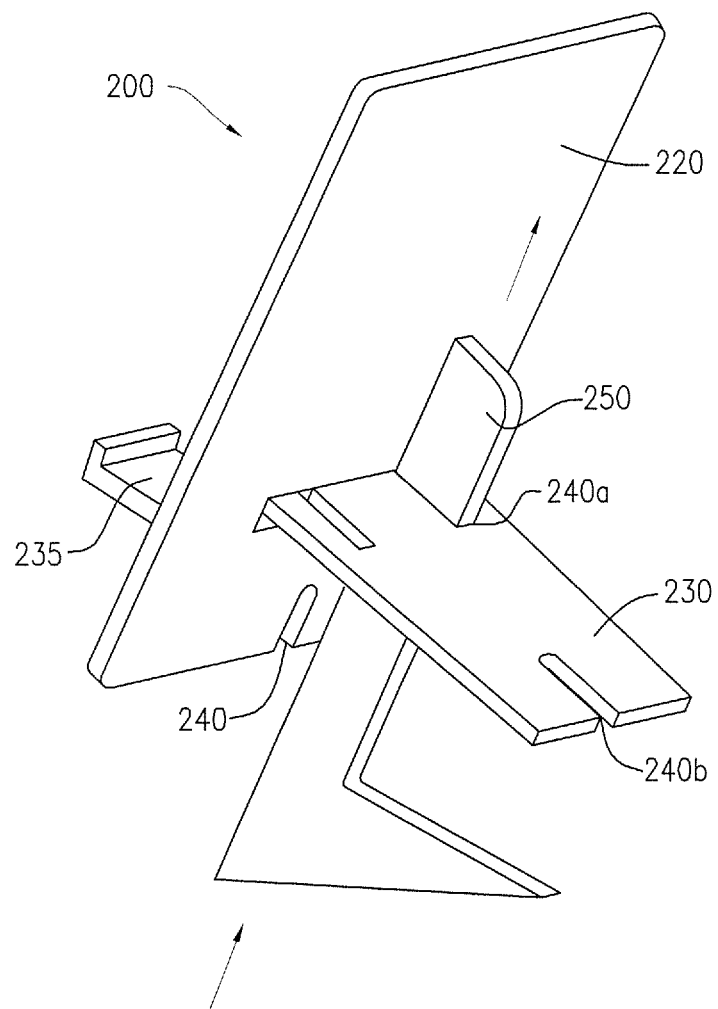
FIG. 7 shows the additional support wedges to enhance strength.

FIG. 7 shows a support wedges 250 used in addition to support panel 230. Support panel includes vertical slots 240. Support wedge 250 is inserted through the bottom of the vertical slot 240a of support panel 250. Slots 240a in which the support wedge is inserted are located opposite top shelf 235. Back panel 220 also has a vertical slot that can be used to insert electronic device cords.

Figure 8:
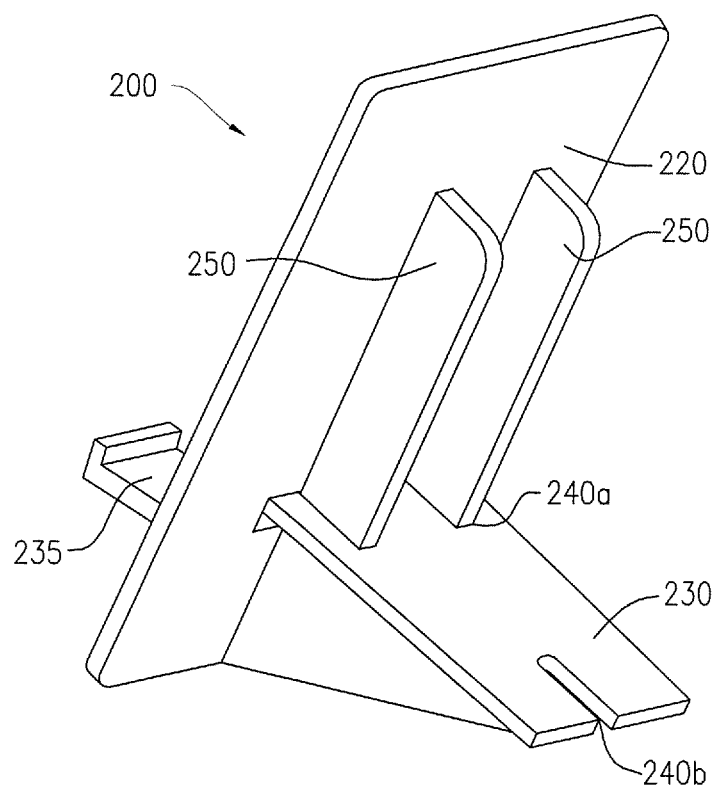
FIG. 8 shows both support wedges in position.

FIG. 8 shows both support wedges 250 used to provide additional support to easel 200. As shown in FIG. 5 as well, support wedges 250 are located in vertical slots 240a in support panel 230. Independent support wedges 250 can be inserted into the two slots 240a provided in the support panel 230 to further enhance structural support.

Graphics including designs and company logos as well as stickers, may be displayed on the shelf front and the backrest surfaces of the easel for purposes of advertising and personalization.

While our description contains much specificity, these should not be construed as limitations on the scope of the invention, but rather as an exemplification of one preferred and some alternate embodiments thereof. Many other variations are possible. For example, non-slip pads such as but not limited to rubber or silicone may be affixed to the bottom of the easel to prevent the easel from sliding on the surface on which it is resting. Non-slip pads such as but not limited to rubber or silicone may also be affixed to the shelf top of the easel to prevent the display object from slipping while resting on the shelf. The edges and interior of the easel may be cut to create abstract or figurative shapes for decorative purposes. The easel may be made larger to hold objects such as books or papers. It may also be made smaller to hold objects such as business cards. Accordingly, the scope of the invention should be determined not by the embodiments illustrated, but by the appended claims and their legal equivalents.

The invention claimed is:

1. An two-part easel for holding objects comprising:
   a first flat panel, the first flat panel having at least one insert slot, wherein the at least one insert slot includes nodes and indents;
   a second panel, the second panel having a shelf section, a support section and an insertable snap-lock pivoting barrel-hinge device, wherein the second panel glides through a selected insert slot of the first panel and engages with the nodes positioning the shelf section on a front side of the first panel and the support section on an opposite side of the first panel.

2. The two-part easel for holding objects of claim 1, wherein at least one opening is made in said shelf section through which an electronic device's charging plug may be inserted.

3. The two-part easel for holding objects of claim 1, wherein an angle at which the object rests on the easel is adjustable based on the location of the selected insertable slot.

4. The two-part easel for holding objects as recited in claim 1 wherein the first panel and the support section of the second panel have a vertical slot for power cord relief.

5. The two-part easel for holding objects as recited in claim 1 wherein the second panel is a snap-in flat panel.

6. The two part easel for holding objects as recited in claim 1 wherein the easel is collapsible and folds flat while the second panel is still inserted through the first panel.

7. The two part easel as recited in claim 6 wherein the easel switches from a folded flat position to an upright position with a single pivot of the already inserted second panel by a user.

8. The two-part easel for holding objects as recited in claim 1 wherein the first panel and the second panel are removably connected.

9. The two-part easel for holding objects as recited in claim 1 wherein the snap lock is a one way lock.

10. The two-part easel for holding objects as recited in claim 1 wherein the shelf section is raised off of a surface on which the easel rests protecting the object from damage.

11. The two-part easel for holding objects as recited in claim 1 further comprising a secondary set of structural support elements that snap in the support section to further enhance the strength of the easel.

12. The two-part easel for holding objects as recited in claim 1 wherein an assembled position creates the angle at which the object is viewed.

13. The two-part easel for holding objects as recited in claim 1 wherein two or more of the two-part easels are modularly connected for a wider graphic element.

* * * * *